(12) United States Patent (10) Patent No.: US 8,933,419 B2
Nuetzel et al. (45) Date of Patent: Jan. 13, 2015

(54) FIBRE OPTIC PHOSPHOR SCREEN COMPRISING AN ANGULAR FILTER

(75) Inventors: Gert Nuetzel, Delft (NL); Pascal Lavoute, Brive-la-Gaillarde (FR); Christophe Fontaine, Ussac (FR)

(73) Assignee: PHOTONIS France, Brive (FR)

( * ) Notice: Subject to any disclaimer, the term of this patent is extended or adjusted under 35 U.S.C. 154(b) by 197 days.

(21) Appl. No.: 13/805,108

(22) PCT Filed: Jun. 17, 2011

(86) PCT No.: PCT/EP2011/060075
§ 371 (c)(1),
(2), (4) Date: Feb. 26, 2013

(87) PCT Pub. No.: WO2011/157809
PCT Pub. Date: Dec. 22, 2011

(65) Prior Publication Data
US 2013/0161535 A1 Jun. 27, 2013

(30) Foreign Application Priority Data
Jun. 18, 2010 (FR) .................................. 10 54859

(51) Int. Cl.
*G01J 1/58* (2006.01)
*G02B 6/08* (2006.01)
*H01J 31/50* (2006.01)
*H01J 29/89* (2006.01)
*B82Y 20/00* (2011.01)

(52) U.S. Cl.
CPC ................. *H01J 31/507* (2013.01); *G02B 6/08* (2013.01); *Y10S 977/70* (2013.01); *B82Y 20/00* (2013.01); *H01J 29/892* (2013.01); *H01J 31/50* (2013.01)

USPC ...................... 250/483.1; 250/458.1; 977/700

(58) Field of Classification Search
USPC ............................................ 250/458.1, 483.1
See application file for complete search history.

(56) References Cited

U.S. PATENT DOCUMENTS

| 5,127,080 A | 6/1992 | Duggan, Sr. |
| 5,594,253 A | 1/1997 | Bueno et al. |
| 6,005,239 A | 12/1999 | Suzuki et al. |
| 2011/0079715 A1 | 4/2011 | Nutzel et al. |
| 2013/0146778 A1 | 6/2013 | Nuetzel et al. |

FOREIGN PATENT DOCUMENTS

| EP | 0 848 410 A1 | 6/1998 |
| JP | 59-201349 A | 11/1984 |

OTHER PUBLICATIONS

U.S. Appl. No. 13/823,018, filed May 31, 2013, Nutzel et al.
International Search Report issued Jul. 8, 2011 in PCT/EP2011/060075 with English translation of categories of cited documents.
J.-Q. Xi, et al., "Optical thin-film materials with low refractive index for broadband elimination of Fresnel reflection", Nature Photonics, vol. 1, Mar. 2007, pp. 176-179.
J.-Q. Xi, et al. "Very low-refractive-index optical thin films consisting of an array of SiO2 nanorods", Optics Letters, vol. 31, No. 5, Mar. 1, 2006, pp. 601-603.

*Primary Examiner* — Mark R Gaworecki
(74) *Attorney, Agent, or Firm* — Oblon, Spivak, McClelland, Maier & Neustadt, L.L.P.

(57) ABSTRACT

An optical fiber phosphor screen including a thin film phosphor layer and an optical fiber faceplate, allowing interfering light in a cladding of the optical fibers to be reduced. The phosphor screen includes an angular filter including at least one layer arranged between the thin film phosphor layer and the optical fiber faceplate.

21 Claims, 8 Drawing Sheets

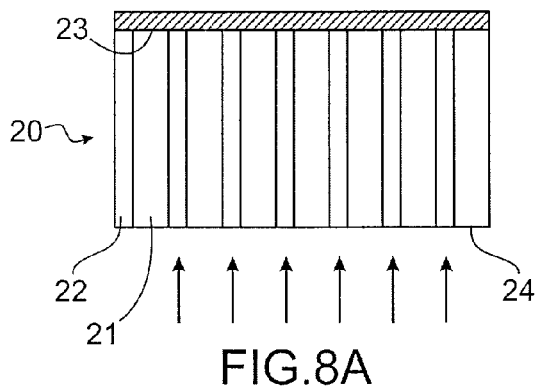 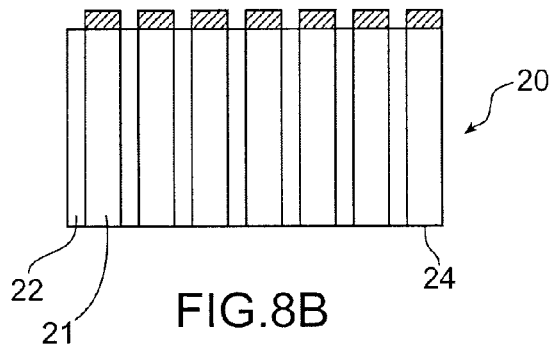
FIG.8A  FIG.8B
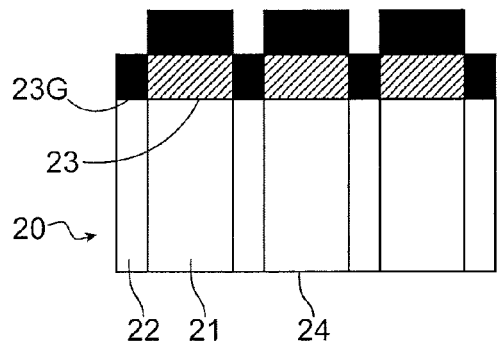
FIG.8C
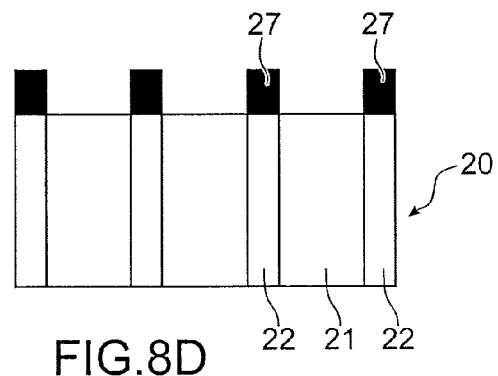
FIG.8D
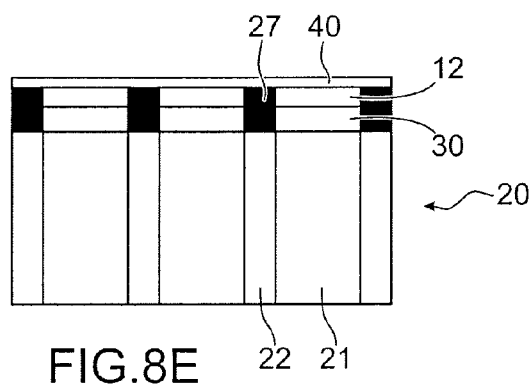
FIG.8E

FIBRE OPTIC PHOSPHOR SCREEN COMPRISING AN ANGULAR FILTER

TECHNICAL FIELD

The present invention relates to the general field of fiber optic phosphor screens, in other words screens comprising a thin film phosphor layer and a fiber optic faceplate.

The invention applies in particular to image intensifier tubes, for example X-ray tubes used in the medical field or tubes used for night vision.

PRIOR ART

Numerous devices use optical fiber phosphor screens. This is the case in particular of image intensifier tubes used within the scope of night vision.

These devices normally comprise three main elements, namely a photocathode, a microchannel plate and a phosphor screen, using for example optical fibers.

The photocathode receives the incident photons coming from the exterior environment to convert them into photoelectrons according to a pattern corresponding to the image of the environment observed.

The microchannel plate multiplies the photoelectrons, which are then transformed by the phosphor screen into an intensified light signal.

The fiber optic phosphor screen also comprises a fiber optic faceplate that transmits the light signal to the exterior of the tube, for example to means of visualisation for the user of said night vision device.

Such a fiber optic phosphor screen thus comprises a layer of phosphor and a fiber optic faceplate.

The phosphor layer is normally formed of a phosphor powder applied on the surface of the fiber optic faceplate. The powder may be deposited using a technique known to those skilled in the art, such as sedimentation, brushing, settling, spraying, etc. The size of the grains of phosphor varies typically between 1 μm and 10 μm and the average thickness of the layer of phosphor is of the order of 5 μm.

However, this powder phosphor screen has several drawbacks. The powder has a significant total surface area, which emits a large quantity of gas from the constituents of the phosphor. This important degassing is to be avoided for a use of the phosphor screen in an ultra-high vacuum environment (of the order of $10^{-10}$ torrs). In addition, a binder, for example an adhesive, may be necessary to ensure the phosphor grains are maintained against the fiber optic faceplate, which complicates the production process of the device and may modify the optical properties thereof. Furthermore, the powdery structure induces a grain effect at the level of the resulting optical image.

The phosphor layer may alternatively be a thin film phosphor layer, formed of a solid film of non-granular phosphor. Unlike the powder phosphor layer, the thin film phosphor layer is made of a continuous material, in other words non-particulate or non-granular. It may be obtained by physical vapour deposition techniques, for example by evaporation or sputtering or by chemical vapour deposition techniques.

A fiber optic phosphor screen of this type thus comprises a thin film phosphor layer and a fiber optic faceplate, as schematically illustrated in transversal section in FIG. 1.

The fiber optic faceplate 20 is conventionally formed of a large number of optical fibers assembled in a bundle. Each optical fiber comprises a core 21 surrounded by a cladding 22. The optical fibers extend along the thickness of the faceplate 20, between a front face 23 and a rear face 24.

A thin film phosphor layer 10 is in contact with the front face 23 of the fiber optic faceplate 20 and extends thereon so as to cover it entirely.

Two angular apertures may be defined at the interface between the thin film phosphor layer and the core of the optical fibers, namely the transmission cone in the core of the optical fibers of the light rays emitted by the thin film phosphor layer, and the numerical aperture of the optical fibers.

The light ray transmission cone in the core of the optical fibers is conventionally defined by application of the Snell-Descartes law at the "phosphor layer/core of the adjacent optical fiber" interface. As shown in FIG. 1, it is characterised by a first critical angle $\theta_{th}^{(1)} = \arcsin(n_C/n_P)$. Here $n_C$ and $n_P$ designate optical indices, or refraction indices, of the core 21 of the optical fibers and the thin film phosphor layer 10, respectively. Also, any light ray of which the angle of incidence θp at said interface is strictly inferior to the first critical angle $\theta_{th}^{(1)}$ is refracted in the core 21 of the fiber. In the opposite case, the light ray is reflected by total internal reflection.

The numerical aperture of the optical fibers forms a second angular aperture at the interface between the thin film phosphor layer 10 and the core 21 of the fibers, characterised by a second critical angle $\theta_{th}^{(2)} = \arcsin(\sqrt{n_C^2 - n_G^2}/n_P)$ where $n_G$ is the optical index of the cladding of the fibers. Also, a light ray that penetrates into the core 21 of the fiber and of which the angle of incidence θp at said "phosphor layer/core of the fiber" interface is less than or equal to said second critical angle $\theta_{th}^{(2)}$ remains localised in the core 21 of the fiber, due to the phenomenon of total internal reflection. The light ray is then guided by the fiber without loss, except for the characteristic attenuation of the optical fiber.

However, this type of phosphor screen has certain drawbacks, relative to these two angular apertures.

In fact, as their expressions show, the first and second critical angles may not be equal. In addition, the first critical angle $\theta_{th}^{(1)}$ is normally substantially greater than the second critical angle $\theta_{th}^{(2)}$.

As an illustration, for normal values of optical indices of the core and the cladding of a fiber, for example $n_C \sim 1.8$, $n_G \sim 1.4$ and $n_P \sim 2.2$, the first and second critical angles are respectively of the order of 55° and 30°, which gives a ratio $\theta_{th}^{(2)}/\theta_{th}^{(1)}$ of the order of 0.6.

The numerical aperture of the optical fibers appears thus substantially more restricted than the light ray transmission cone in the core of the fibers.

Consequently, any light ray emitted by the thin film phosphor layer 10 and having an incident angle θp comprised between the two critical angles is transmitted in the core 21 of the optical fiber then refracted in the cladding 22, thereby forming the interfering light. In the preceding example, the risk that a light ray is comprised between said two critical angles is of the order of 70%.

It appears clearly that this risk is particularly high and substantially reduces the performances of the phosphor screen and consequently those of the optical device containing it. More precisely, the output image has a strongly reduced contrast. Furthermore, in the case where said light ray remains captured in the optical fiber faceplate and thus does not participate in the formation of the output image, the efficiency of the phosphor screen is substantially degraded.

DESCRIPTION OF THE INVENTION

The aim of the invention is mainly to present a fiber optic phosphor screen which comprises a thin film phosphor layer, making it possible to reduce the risks of refraction of light rays, initially transmitted in the core of an optical fiber, in the corresponding cladding.

To this end, the subject matter of the invention is a fiber optic phosphor screen comprising a thin film phosphor layer and a fiber optic faceplate assembled in a bundle and oriented along the thickness of said faceplate, each fiber optic comprising a core of optical index $n_C$ surrounded by a cladding of optical index $n_G$, said thin film phosphor layer being arranged on one face of the faceplate.

According to the invention, said fiber optic phosphor screen comprises an angular filter comprising at least one layer, arranged between said thin film phosphor layer and said face of the faceplate, such that a light ray emitted by the thin film phosphor layer and passing through the angular filter penetrates into the core of the adjacent optical fiber with an angle of refraction less than or equal to $\pi/2 - \arcsin(n_G/n_C)$.

Thus, any light ray emitted by the phosphor layer and transmitted by the angular filter in the core of the adjacent optical fiber remains localised in the core by total internal reflection between the core and the cladding of the fiber. In other words, the light ray that penetrates into the adjacent optical fiber belongs to the numerical aperture of the fiber. Unlike the example of the prior art mentioned previously, the invention reduces in a significant manner the interfering light inside the cladding of the different optical fibers. The efficiency of the phosphor screen is enhanced and the output image formed by the phosphor screen has a better contrast.

Thin film phosphor layer is taken to mean a phosphor layer produced in the form of thin film made of a non-particulate or non-granular material.

Adjacent optical fiber is taken to mean the optical fiber arranged opposite the input zone of the light ray in the angular filter.

Thin film is taken to mean a layer of which the thickness is low with respect to its length and width dimensions. Its thickness is normally of the order of several nanometers to several hundreds of nanometers.

The efficiency of the phosphor screen is here defined as the ratio between the number of light rays, or photons, emitted by the thin film phosphor layer and participating effectively in the formation of an image and the total number of light rays, or photons, emitted by the thin film phosphor layer. It is understood that the light rays refracted in the cladding of an optical fiber are likely not to participate in the formation of the output image, thus to degrade the efficiency of the phosphor screen and/or to reduce the contrast of the output image.

Preferably, said angular filter is directly in contact with the thin film phosphor layer on the one hand and said face of the fiber optic faceplate on the other hand. The thickness of said angular filter is, preferably, substantially constant. Each optical fiber preferentially emerges at the level of said face of the faceplate in a substantially orthogonal manner.

According to the preferred embodiment of the invention, said angular filter is an interference filter comprising a stack of thin films, the optical indices and the thicknesses of which are suited to transmitting a light ray in the core of the adjacent optical fiber along an angle of refraction less than or equal to $\pi/2 - \arcsin(n_G/n_C)$.

Advantageously, the phosphor of the thin film phosphor layer emits a quasi-monochromatic radiation. The interference filter may be a band pass filter or a low pass filter.

Preferably, said plurality of thin films of the interference filter comprises a first assembly of thin films made of a first material and a second assembly of thin films made of a second material having an optical index less than that of the first material. The first material may be selected, for example, from $TiO_2$ and $Ta_2O_5$, and the second material may be selected, for example, from $MgF_2$, $CaF_2$ and $SiO_2$.

The first material and/or the second material may form a porous medium or a non-porous medium. In the case of a porous medium, said first and second materials may be nanometric rods of $SiO_2$ and/or $TiO_2$.

According to a second embodiment of the invention, said angular filter comprises a single layer.

Advantageously, said single layer of the angular filter has an optical index less than or equal to $\sqrt{n_C^2 - n_G^2}$.

The material of the single layer of the angular filter may form a non-porous medium, or, in a variant, a porous medium. In the case of a porous medium, said layer of the angular filter may be formed of a plurality of nanometric $SiO_2$ rods.

Advantageously, said thin film phosphor layer forms a plurality of phosphor pads arranged so as to each cover the core of the facing fiber, or adjacent optical fiber, according to the definition given previously. Said pads are spatially separate from each other.

Pad is taken to mean a layer of which the thickness is not negligible vis-à-vis its two other length and width dimensions. The thickness of a pad may be of the same order of magnitude as its length and/or its width.

Advantageously, the angular filter forms a plurality of pads arranged so as to each be substantially covered by a phosphor pad.

Each assembly formed of a stack of a phosphor pad and an angular filter pad may be arranged in a hollowing out of the front face of the optical fiber faceplate, and delimited laterally by a projecting part of optical fiber cladding. Said assemblies of pads are physically separate from each other. Preferably, the lateral surface of the projecting part of optical fiber cladding is covered with a layer of metallic material. This layer is thus reflective vis-à-vis light rays emitted by the phosphor pads.

Alternatively, each assembly formed of a stack of a phosphor pad and an angular filter pad may be delimited laterally by added walls, each wall being arranged so as to cover substantially the cladding of the adjacent optical fiber. Said assemblies of pads are physically separate to each other. The walls may be made of a reflective or absorbent material for the light rays emitted by the phosphor pads.

Advantageously, said thin film phosphor layer is covered, on its face opposite to said angular filter, with a reflective layer vis-à-vis light rays emitted by said thin film phosphor layer. Said reflective layer is, preferably, made of aluminium.

The invention also relates to an optical device comprising a photocathode to receive a radiation and emit electrons in response, and an optical fiber phosphor screen according to any of the preceding characteristics to form an image from said electrons.

The optical device may comprise, moreover, electron multiplication means arranged between said photocathode and said phosphor screen.

Said optical device may be an image intensifier tube, for example for night vision.

Other advantages and characteristics of the invention will become clear in the detailed non-limiting description below.

BRIEF DESCRIPTION OF DRAWINGS

Embodiments of the invention will now be described, given as non-limiting examples and by referring to the appended drawings, in which:

FIGS. 8A to 8E illustrate the different steps of the method of producing the phosphor screen represented in FIG. 7.

DETAILED DESCRIPTION OF A PREFERRED EMBODIMENT

Figure 1:
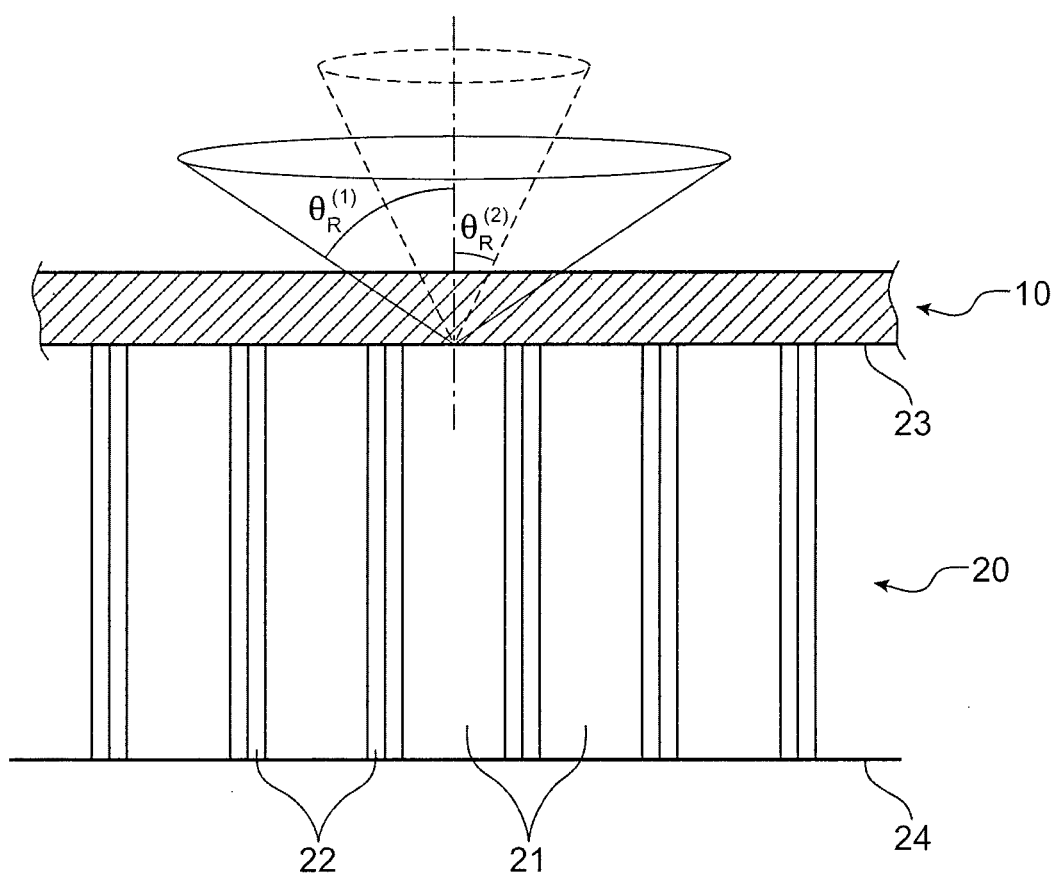
FIG. 1, already described, is a schematic transversal section view of a optical fiber phosphor screen according to an example of the prior art.
Figure 2:
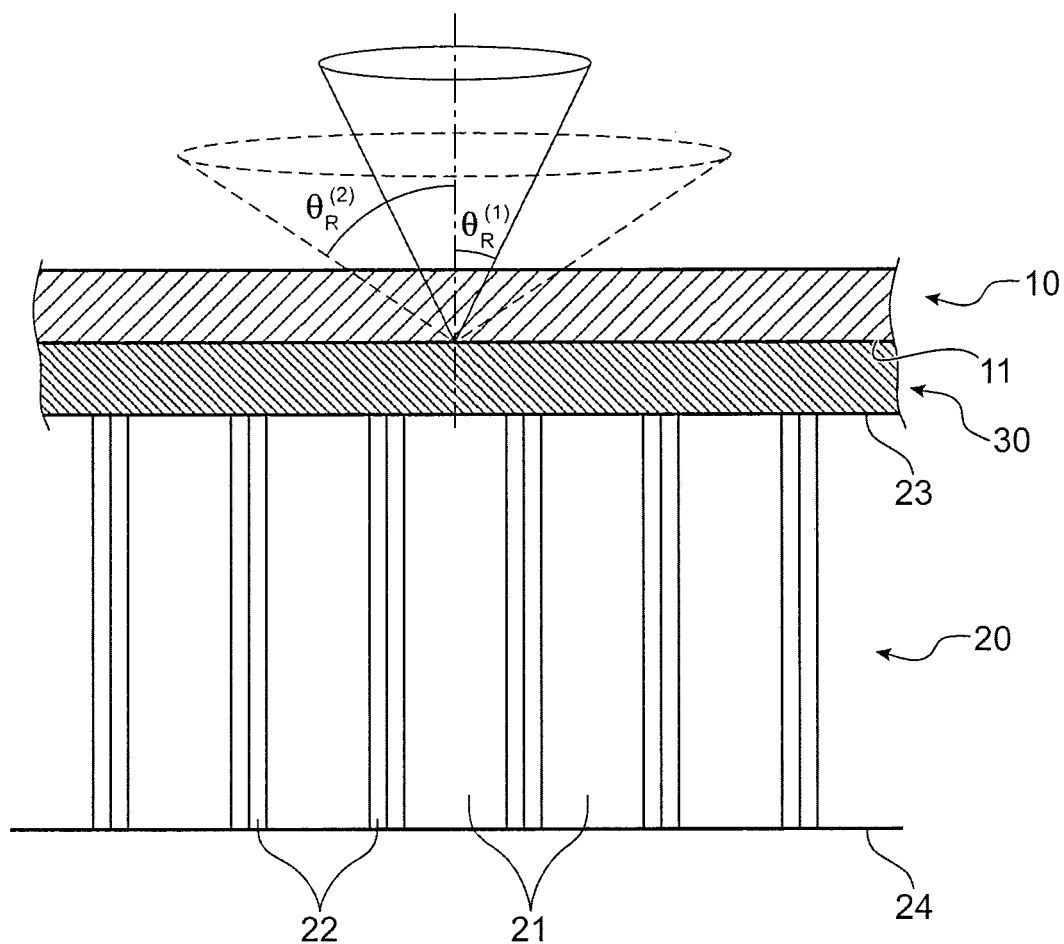
FIG. 2 is a schematic transversal section view of a phosphor screen according to the invention.

FIG. 2 illustrates a optical fiber phosphor screen according to the invention which can equip, for example, an image intensifier tube.

The phosphor screen according to the invention comprises a thin film phosphor layer 10 and a optical fiber faceplate 20.

The optical fibers of the faceplate 20 are assembled in bundles and oriented along the thickness of said faceplate.

Each optical fiber comprises a core 21 of optical index $n_C$ surrounded by a cladding 22 of optical index $n_G$.

It is considered that the materials forming the core 21 and the cladding 22 of the optical fibers of the faceplate 20 of fibers are identical for each of the fibers.

The optical fibers emerge at the level of the front face 23 of the faceplate in a substantially orthogonal manner.

The thin film phosphor layer 10 is arranged on said front face 23 of the faceplate 20. It covers the front face 23 of the optical fiber faceplate 20, uniformly or in a discontinuous manner, without being in contact therewith.

As explained previously, the thin film phosphor layer 10 forms a continuous medium, in other words a non-particulate or non-granular medium, as opposed to the particulate medium of the powder phosphor layer. Its thickness is comprised between several tenths of microns to several tens of microns, for example between 0.5 µm and 50 µm.

The material of the thin film phosphor layer may comprise, for example, Gd2O2S:Tb (GOS:Tb) or yttrium-aluminium-garnet (YAG) doped with cerium.

It may be obtained by various known techniques of physical vapour deposition, for example by evaporation or sputtering, or by known techniques of chemical vapour deposition such as, for example, ALD (Atomic Layer Deposition). The optical index of the phosphor layer 10 is noted $n_P$.

The phosphor screen also comprises an angular filter 30 comprising at least one layer, arranged between said thin film phosphor layer 10 and said face 23 of the faceplate 20.

Said angular filter 30 is directly in contact with the thin film phosphor layer 10 on the one hand and said face 23 of the optical fiber faceplate 20 on the other hand. Preferably, the angular filter has a substantially constant thickness.

According to the invention, the angular filter 30 ensures that any light ray emitted by the thin film phosphor layer 10 and passing through it then penetrates into the core 21 of the adjacent optical fiber with an angle of refraction less than or equal to $\pi/2 - \arcsin(n_G/n_C)$.

Thus, any light ray emitted by the thin film phosphor layer 10 that penetrates into the core 21 of a optical fiber with such an angle of refraction belongs to the numerical aperture thereof.

By convention, an angle of incidence and an angle of refraction are always defined with respect to the normal at the interface between two media of different optical indices.

Figure 3:
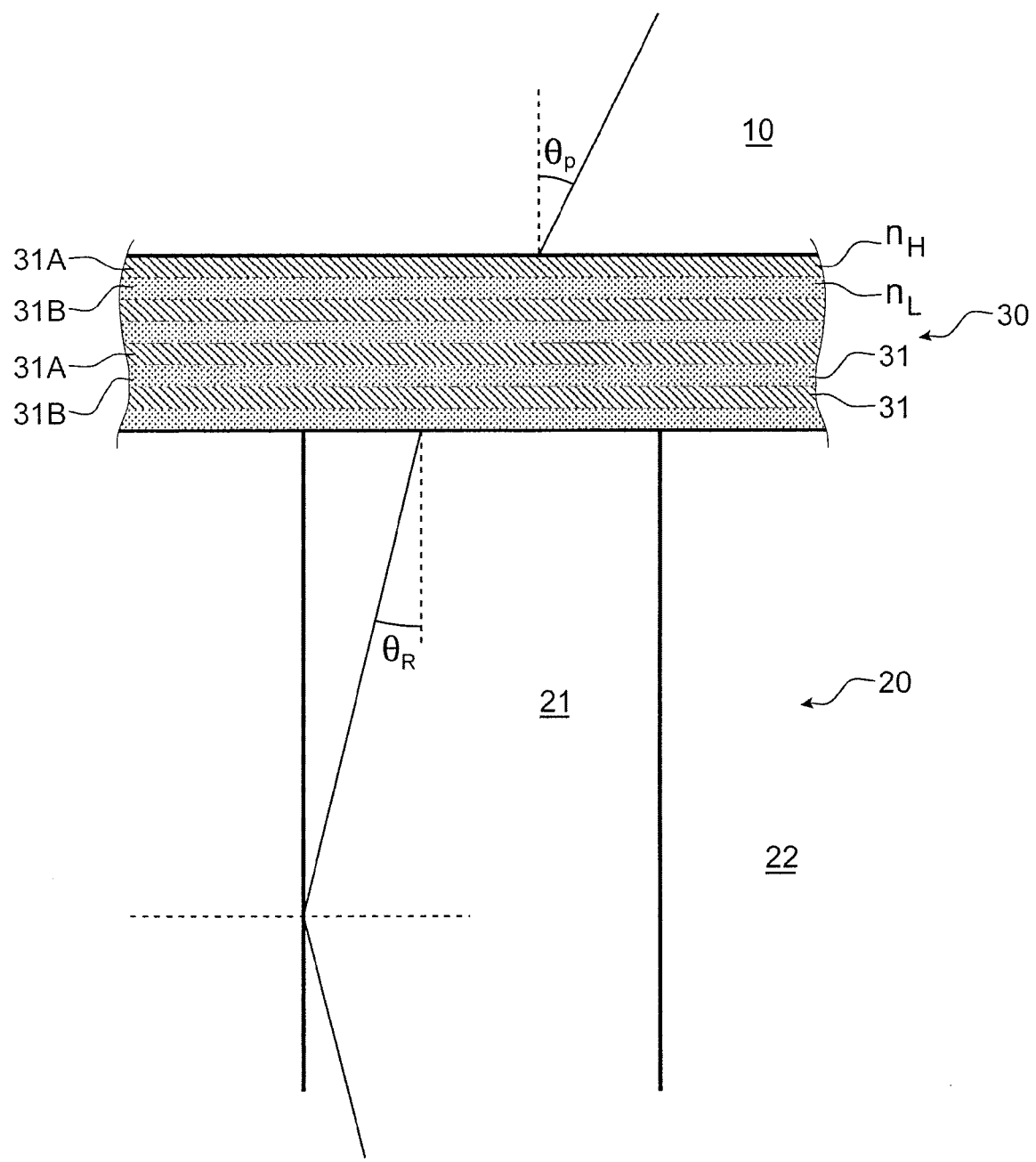
FIG. 3 is a schematic transversal section view of a phosphor screen according to a preferred embodiment of the invention, wherein the angular filter is an interference filter.

According to the preferred embodiment of the invention, the angular filter 30 is an interference filter. As illustrated in FIG. 3, it comprises a stack of a plurality of thin films 31.

Thin film is taken to mean a layer in which the dimension along the thickness is small compared to the length and width dimensions. Its thickness is typically of the order of several nanometers to several hundreds of nanometers.

Preferably, said plurality of thin films comprises at least two assemblies 31A, 31B of thin films in which the thin films of a same assembly are made of a same material. The materials of the different assemblies have different optical indices to each other.

The thicknesses and the materials are selected so as to ensure that any light ray transmitted by the angular filter 30 penetrates into the core of the adjacent optical fiber along an angle of refraction less than or equal to $\pi/2 - \arcsin(n_G/n_C)$.

The plurality of thin films may comprise a first assembly 31A of thin films made of a first material of high optical index $n_H$ and a second assembly 31B of thin films made of a second material of low optical index $n_L$ less than that of the first material.

The thin films 31 are arranged so as to have an alternation between the thin films of the first assembly 31A and the thin films of the second assembly 31B.

The first and second materials may each form a continuous medium. They may be selected, for the first material, from $TiO_2$ (n~1.81) and $Ta_2O_5$ (n~2.50), and for the second material, from $MgF_2$ (n~1.39), $CaF_2$ (n~1.44) and $SiO_2$ (n~1.55).

The thin films 31 may have a quarter wave thickness, as a function of the wavelength of the light rays emitted by the thin film phosphor layer 10. The reflectance of the interference filter is thereby reduced.

The interference filter 30 is a band pass filter or a low pass filter, and the thin film phosphor layer 10 emits a monochromatic or quasi-monochromatic light ray.

Phosphor Gd2O2S:Tb, for which the wavelength is of the order of 550 nm, is an example of material emitting a quasi-monochromatic radiation. Phosphor comprising yttrium-aluminium-garnet (YAG) doped with cerium having a wavelength of the order of 550 nm may also be used.

The optical angular filtering property of the interference filter 30 is now described. The bandwidth $\Delta$ of an interference filter is normally defined at zero incidence $\theta=0°$, from the evolution $T(\lambda)$ of the transmittance of the filter as a function of the wavelength of the incident radiation.

It is known that for a light ray having a non zero angle of incidence, the bandwidth $\Delta_\theta$ of the filter is modified and exhibits in particular a shifting towards the lower wavelengths. This modification stems from the fact that the apparent thickness of the thin films of the filter increases with the angle of incidence.

The shifting of the bandwidth $\Delta_\theta$ of the filter towards lower wavelengths results in a shifting towards lower wavelengths of the cut off value, or values, of the filter. A low pass filter comprises in fact a single cut off value and a band pass filter comprises two cut off values, upper and lower.

Bandwidth cut off value is taken to mean the value of the wavelength for which the transmittance is less than 50% of its maximal value, or 20%, 10%, or even 5%.

As an illustration, in the case of a band pass filter, the relation between the central wavelength of the filter and the angle of incidence may be described by the following expression:

$$\lambda_\theta = \lambda_0 \cdot \sqrt{1 - \left(\frac{n_P}{n^*}\right)^2 \sin^2\theta}$$

where $\theta$ is the angle of incidence of a light ray emitted by the thin film phosphor layer at the interface with the interference filter, $\lambda_0$ is the value of the central wavelength of the filter at zero incidence, $n_P$ is the optical index of the thin film phosphor layer and $n^*$ is the value of the effective optical index of the filter.

As an illustration, for an upper cut off value of the order of 570 nm at zero incidence of a band pass interference filter, and for optical indices $n_P\sim2.2$ and $n^*\sim2$, the cut off value becomes of the order of 480 nm for an incident angle of 30°.

Thus, in this example, the interference filter is on for a radiation of wavelength of 550 nm emitted at zero incidence by the thin film phosphor layer, and off when said radiation has an angle of incidence of 30°.

Figure 4A:
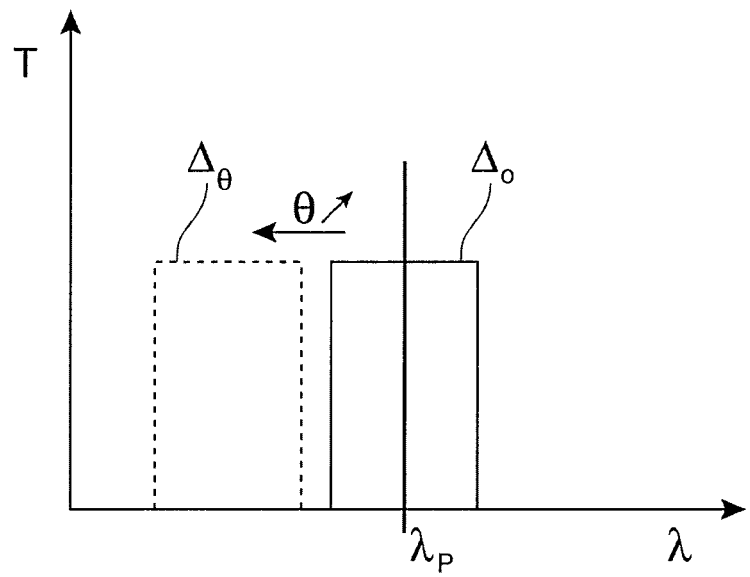
FIGS. 4A and 4B schematically represent the evolution of the transmittance of the angular filter in the domain of wavelengths, as a function of the angle of incidence of a light ray (FIG. 4A), and the corresponding relationship of the transmittance as a function of the angle of incidence of said ray (FIG. 4B)
Figure 4B:
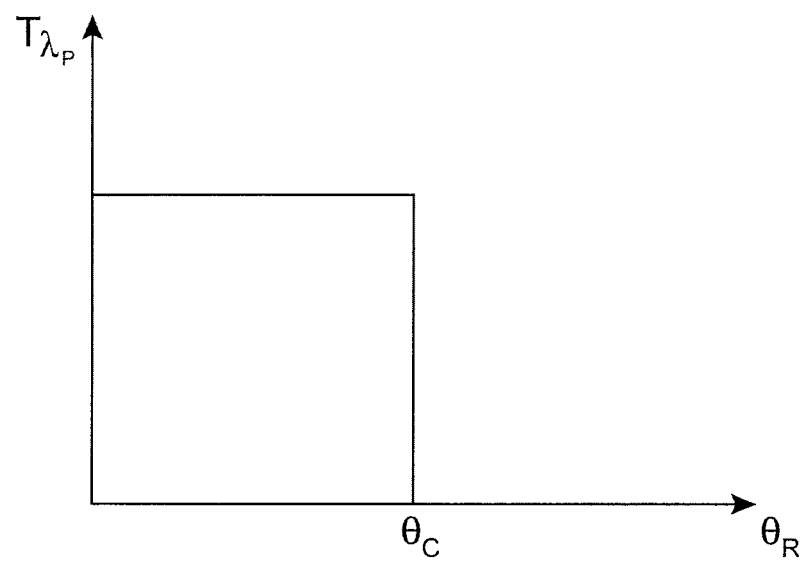

It appears, as shown in FIGS. 4A and 4B, that a band pass (FIG. 4A) or low pass interference filter in the domain of wavelengths $T(\lambda)$ is equivalent to a low pass filter (FIG. 4B) in the domain of angles of incidence $T(\theta)$ for a determined wavelength.

In fact, when the shifting of the bandwidth $\Delta_\theta$ towards low wavelengths is sufficient, the wavelength $\lambda_P$ of the radiation emitted by the thin film phosphor layer is situated outside of the bandwidth. A cut off incident angle $\theta_C$ may then be determined, which characterises the low pass filter in the domain of angles of incidence $T(\theta)$ for the wavelength $\lambda_P$. The light ray is then reflected, it no longer belongs to the transmission cone of the interference filter in the core of the adjacent optical fiber. The cut off incident angle may also be noted $\theta_{th}^{(1)}$, according to the definition of this angle given later.

Furthermore, due to the fact that the optical indices $n_H$, $n_L$ of the thin films 31 forming the interference filter 30 are known, the relation $\theta_R(\theta_P)$ between the angle of incidence $\theta_P$ of a light ray emitted by the thin film phosphor layer 10 and the angle of refraction $\theta_R$ in the core 21 of the adjacent optical fiber of this same refracted light ray is directly determined by the Snell-Descartes law.

Thus, the interference filter 30 is formed and the thin film phosphor layer 10 chosen such that the cut off incident angle $\theta_C$ of the interference filter leads to an angle of refraction $\theta_R$ less than or equal to $\pi/2-\arcsin(n_G/n_C)$ in the core 21 of the adjacent optical fiber.

During the production of the interference filter, in so far as a plurality of variables is necessary to obtain the requisite bandwidth, the transmittance is calculated advantageously using a computer programme as a function of the wavelength as well as the transmittance as a function of the angle of incidence.

As an illustration, in the case of a phosphor layer 10 of Gd2O2S:Tb, the interference filter 30 may comprise a plurality of thin films in the form of a stack of $TiO_2$ layers and $MgF_2$ layers. The interference filter may comprise five thin films, namely a layer of $MgF_2$ of 218 nm, a layer of $TiO_2$ of 102 nm, a layer of $MgF_2$ of 210 nm, a layer of $TiO_2$ of 230 nm and finally a layer of $MgF_2$ of 218 nm.

The interference filter 30 may be produced by known techniques of physical vapour deposition, such as, for example, cathodic sputtering, evaporation, or EBPVD (electron beam physical vapour deposition). Known techniques of chemical vapour deposition, such as, for example, ALD (Atomic Layer Deposition) may also be used, as well as known techniques called hybrid, such as, for example, reactive sputtering and IBAD, (ion beam assisted deposition).

In a variant, the first and second materials of the interference filter may form a porous medium. Thus, an interference filter comprising a stack of nanometric $SiO_2$ and $TiO_2$ rods may be used, the thicknesses and the optical indices of which may be determined precisely, as presented in the article of Xi et al. entitled "*Optical thin film materials with low refractive index for broadband elimination of Fresnel reflection*", 2007, Nat. Photonics, Vol. 1, 176-179.

In fact, by using physical vapour deposition techniques, in which the vapour flux has an inclination angle with respect to the substrate, here the front face of the optical fiber faceplate, it is possible to form layers of $SiO_2$ or $TiO_2$ in the form of nanorods. The optical indices may vary from 1.46 to 1.05 for $SiO_2$, and from 2.7 to 1.3 for $TiO_2$.

Furthermore, the interference filter is not limited to two assemblies of thin films but may comprise three or four assemblies, or more, of thin films.

Figure 5:
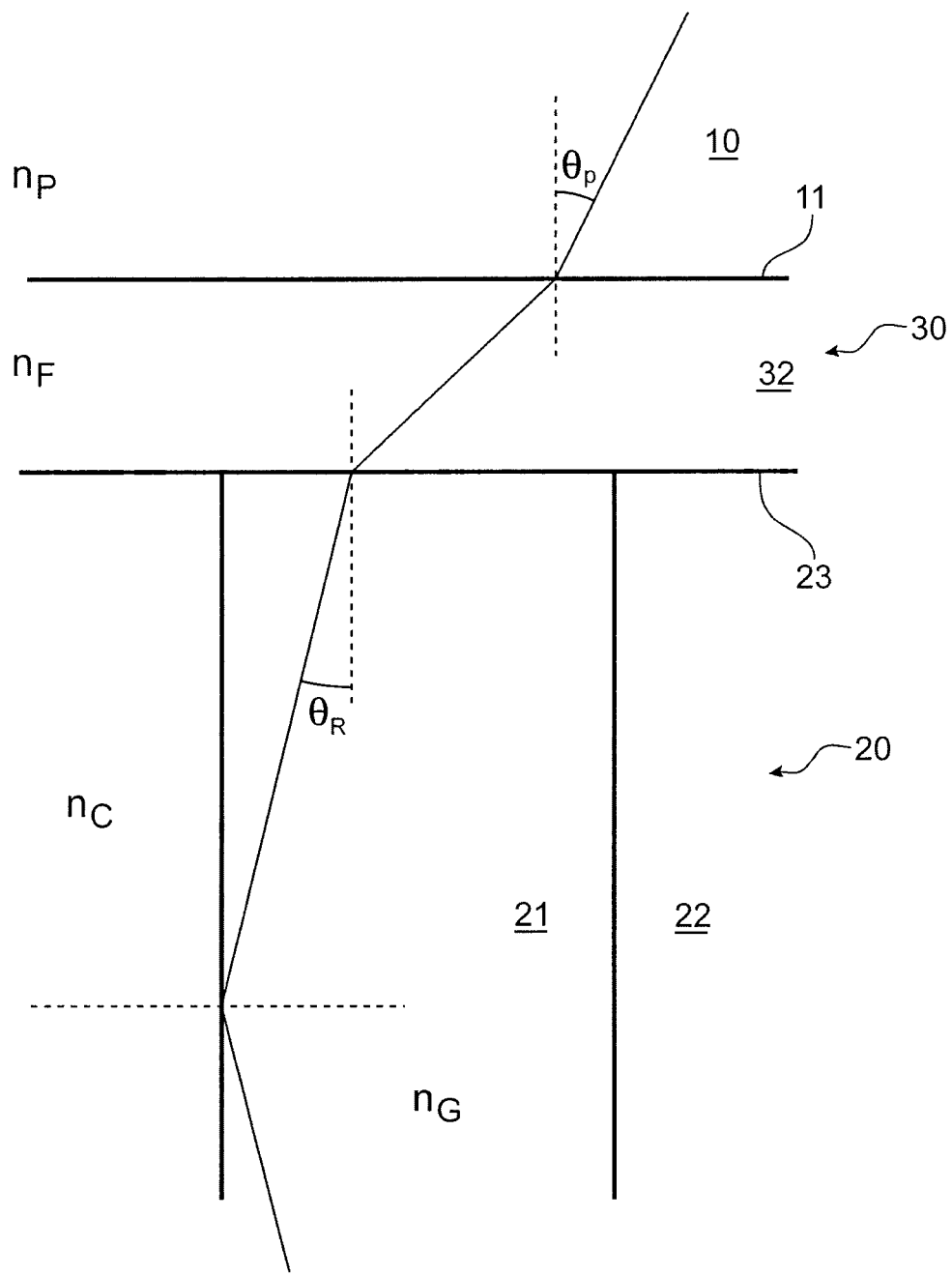
FIG. 5 is a schematic transversal section view of a phosphor screen according to a second embodiment of the invention, wherein the angular filter is formed of a single layer of a material forming a porous or non-porous medium.

According to a second embodiment, the angular filter 30 comprises a single layer 32, having an optical index noted $n_F$, as illustrated in FIGS. 2 and 5.

The optical index of the single layer 32 is defined such that a light ray emitted by the thin film phosphor layer 10 and passing through the angular filter 30 penetrates into the core 21 of the adjacent optical fiber with an angle of refraction $\theta_R$ less than or equal to $\pi/2-\arcsin(n_G/n_C)$.

The single layer 32 is arranged between the thin film phosphor layer 10 and the front face 23 of the optical fiber faceplate 20, and is in direct contact with them.

In a similar manner to the example of the prior art described previously, two angular apertures may be defined (FIG. 2) at the interface 11 between the thin film phosphor layer 10 and the single layer 32 of the angular filter 30.

The first angular aperture corresponds to the transmission cone of light rays emitted by the phosphor layer 10 in the thin film of the angular filter 30.

This transmission cone is defined by the first critical angle $\theta_{th}^{(1)}=\arcsin(n_F/n_P)$. Thus, any light ray emitted by the thin film phosphor layer 10 and having an angle of incidence at said "phosphor layer 10/single layer 32 of the filter 30" interface 11 strictly less than the first critical angle $\theta_{th}^{(1)}$ is transmitted by refraction in the angular filter 30, or reflected by total internal reflection in the opposite case.

The second angular aperture corresponds to the numerical aperture of the optical fibers, defined not at the input of the optical fibers, but at the interface 11 between the thin film phosphor layer 10 and the single layer 32 angular filter 30.

By application of the Snell-Descartes law, the numerical aperture is characterised by a second critical angle $\theta_{th}^{(2)}$ $=\arcsin(\sqrt{n_C^2-n_G^2}/n_P)$. Any light ray emitted by the thin film phosphor layer 10 and having an angle of incidence θp vis-à-vis said interface 11 less than or equal to said second critical angle is transmitted in the core 21 of the adjacent optical fiber and remains localised in the core 21 by total internal reflection between the core 21 and the cladding 22 of the fiber considered.

The optical index $n_F$ of the single layer of the angular filter may be selected such that $\theta_{th}^{(1)} \le \theta_{th}^{(2)}$, which results in the relationship $n_F \le \sqrt{n_C^2-n_G^2}$.

Thus, a light ray emitted by the thin film phosphor layer 10 and having an incident angle $\theta_P$ strictly less than $\theta_{th}^{(1)}$ passes through the angular filter and penetrates into the core of the adjacent optical fiber with an angle of refraction less than or equal to $\pi/2 - \arcsin(n_G/n_C)$. Also, it remains localised in the core 21 of the fiber by total internal reflection between the core 21 and the cladding 22 of the fiber considered.

It is particularly advantageous that the optical indices $n_F$ are selected close to or equal to $\sqrt{n_C^2-n_G^2}$. Thus, the first and second critical angles are substantially equal, which makes the two optical apertures defined previously coincide. The angular filter 30 then has an optical impedance adaptation function. In fact, the transmission cone has the largest aperture for which a light ray emitted by the phosphor layer 10 incident vis-à-vis the "phosphor layer/angular filter" interface 11 belongs to the numerical aperture of the adjacent optical fiber.

As an example, for a thin film phosphor layer 10 of index $n_F \sim 2.2$ and optical fibers in which the optical index of the core 21 is $n_C \sim 1.8$ and the index of the cladding 22 is $n_G \sim 1.4$, the index $n_F$ of the single layer 32 of the angular filter 30 must be less than or equal to 1.13.

Preferably, the thickness of the single layer 32 of the angular filter 30 is substantially of the order of the quarter wave. This thickness is thus determined as a function of the wavelength or the range of wavelengths of the light rays emitted by the thin film phosphor layer 10. It is thus advantageous that the thin film phosphor layer 10 emits a quasi-monochromatic radiation.

The single layer 32 of the angular filter 30 may be made of a material forming a non-porous medium, as opposed to a porous medium. Said material may be selected such that its optical index satisfies the relationship $n_F \le \sqrt{n_C^2-n_G^2}$.

As an example, for optical fibers in which the index of the core 21 is $n_C \sim 2.1$ and the index of the cladding 22 is $n_G \sim 1.5$, the index $n_F$ of the single layer 32 of the angular filter 30 must be less than or equal to 1.47. The material of the single layer 32 may be selected from $MgF_2$, $CaF_2$ or $SiO_2$, the optical indices of which are, respectively, substantially equal to 1.39, 1.44, and 1.46.

As an illustration, in the case of a phosphor layer 10 of $Gd_2O_2S$:Tb, the angular filter 30 may be formed of a single layer of $MgF_2$ of a thickness of 260 nm.

The angular filter 30 may be produced by known techniques of physical vapour deposition, such as, for example, cathodic sputtering, evaporation, or EBPVD (electron beam physical vapour deposition). Known techniques of chemical vapour deposition, such as, for example, ALD (Atomic Layer Deposition) may also be used, as well as known techniques called hybrid, such as, for example, reactive sputtering and IBAD (ion beam assisted deposition).

According to a variant of the second embodiment of the invention, the single layer 32 may be made of a material forming a porous medium. The layer may be formed such that its optical index $n_F$ satisfies the relationship $n_F \le \sqrt{n_C^2-n_G^2}$.

The layer 32 may thus be formed of $SiO_2$ rods of nanometric size, as presented in the article of Xi et al. entitled *"Very low-refractive-index optical thin films consisting of an array of $SiO_2$ nanorods"*, 2006, Opt. Lett., Vol. 31, No. 5, 601-603.

The $SiO_2$ rods extend in a substantially rectilinear and sloping manner from the front face of the optical fiber faceplate. The inclination angle is of the order of 45°.

The thickness of the single layer 32 may be of the order of several tens to several hundreds of nanometers.

The optical index of the single layer of the angular filter 30 may be less than $n_F \le \sqrt{n_C^2-n_G^2}$. The article cited indicates an index $n_F = 1.08$.

Thus, due to the low optical index $n_F$ of the single layer 32 of the angular filter 30, the ratio $\theta_{th}^{(2)}/\theta_{th}^{(1)}$ between the second critical angle $\theta_{th}^{(2)}$ characterising the numerical aperture of the adjacent optical fiber at the level of the "phosphor layer/angular filter" interface 11 and the first critical angle $\theta_{th}^{(1)}$ characterising the transmission cone at said interface 11, is close to 1.

By way of example, for normal optical indices of the thin film phosphor layer, the core and the cladding of the order of $n_F \sim 2.2$, $n_C \sim 1.8$, and $n_G \sim 1.4$, respectively, and an index of the angular filter of $n_F \sim 1.08$, a ratio $\theta_{th}^{(2)}/\theta_{th}^{(1)}$ of the order of 1 is obtained. Thus, all of the light rays emitted by the thin film phosphor layer 10 which pass through the angular filter 30 are assured to penetrate into the core 21 of the adjacent optical fiber and to remain localised in the core 21 by total internal reflection between the core 21 and the cladding 22.

The embodiment of the single layer made of $SiO_2$ nanorods is now described, with reference to the article, cited previously, of Xi et al. and published in Optics Letters.

The nanorods are obtained by a physical vapour deposition technique, at oblique angle. The vapour flux, here $SiO_2$, is obtained by evaporation. It is directed towards the substrate, here the front face of the optical fiber faceplate, along an inclination angle of the order of 85°.

Due to the inclination of the vapour flux, random fluctuations in growth of the single layer lead to the appearance of shadow zones that cannot be reached by the vapour flux.

This effect, known as "self-shadowing effect" by the authors of the article cited, is reflected by the fact that the deposition takes place preferentially in the growth zones and not in the shadow zones. An array of nanorods is then obtained.

The cited article indicates that the nanorods are spaced apart by a distance less than 30 nm, thus much less than the normal range of the wavelengths of the thin film phosphor layers used in image intensifier tubes, which makes it possible to minimise optical scattering effects.

Furthermore, the deposition by evaporation technique used makes it possible to control precisely the thickness of the single layer and thus form a quarter wave layer.

Finally, the article cited states that the thin film remains isotropic, despite the inclination of the $SiO_2$ nanorods, due in particular to the high porosity and the low thickness of the single layer.

It should be noted that it is also possible to produce a single layer formed of $TiO_2$ rods of nanometric size, the optical index of which satisfies the condition $n_F \le \sqrt{n_C^2-n_G^2}$.

Furthermore, a reflective layer (not represented), for example made of aluminium, is deposited on the thin film phosphor layer, to reflect any light ray emitted by the thin film phosphor layer in a direction opposite to the angular filter. Thus, the light ray is reflected and transmitted in the direction of the latter.

The layer of aluminium may have a thickness comprised between several nanometers and several tens of nanometers, for example between 5 nm and 10 nm.

Whatever the embodiment of the invention, the thin film phosphor layer may be structured so as to form a plurality of phosphor pads arranged so as to each cover the core of the adjacent fiber.

Thus, when a light ray emitted by a phosphor pad does not belong to the transmission cone in the angular filter, in other words that the angle of incidence is greater than $\theta_C$ in the case of the interference filter, or greater than $\theta_{th}^{(1)}$ in the case of an angular filter with a single layer, the light ray is reflected but remains advantageously localised in the initial pad. The light ray is then reflected at the interface with the layer of aluminium up to it having the angle of incidence required to be transmitted in the angular filter.

Figure 6:
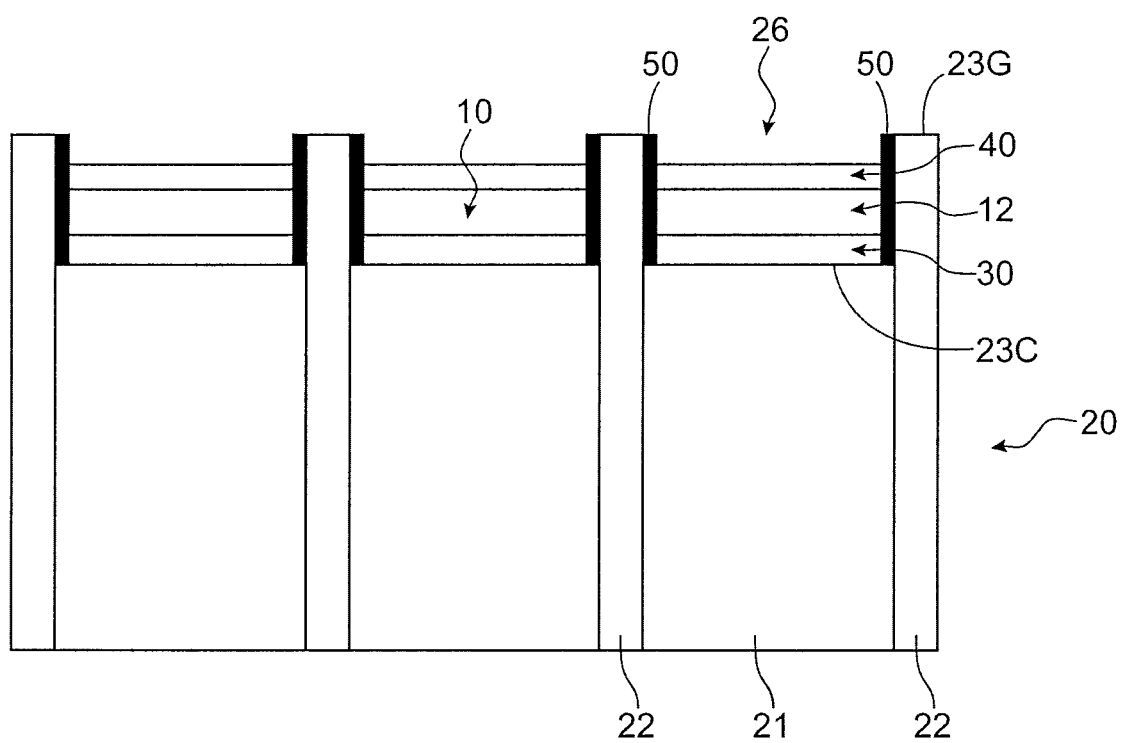
FIG. 6 is a schematic transversal section view of a phosphor screen according to another embodiment, wherein the angular filter and the thin film phosphor layer are in the form of pads of layers covering the core of each optical fiber and delimited laterally by parts of fiber cladding.
Figure 7:
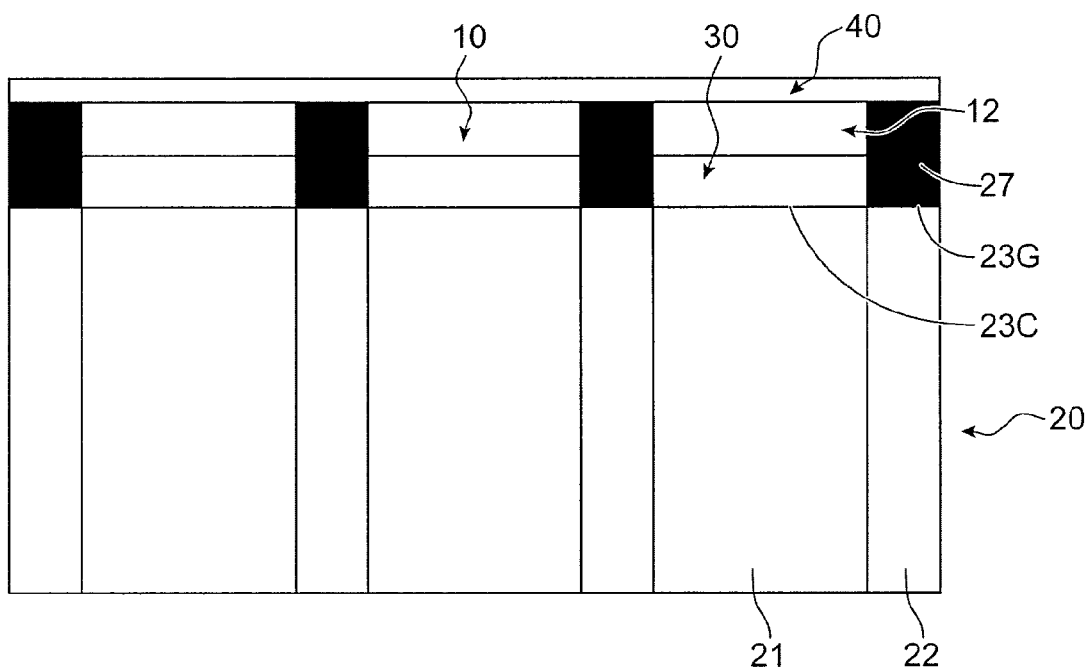
FIG. 7 is a schematic transversal section view of a phosphor screen according to another embodiment, which differs from the preceding embodiment in that the pads of layers are delimited by walls of a deposited material.

FIGS. 6 and 7 illustrate embodiments that only differ from those described by the fact that the thin film phosphor layer 10 and the angular filter 30 are arranged so as to only cover the core 21 of each adjacent fiber, and not the cladding 22 thereof.

In the embodiment illustrated in FIG. 6, the front face of the optical fiber faceplate 20 is structured such that each optical fiber has an uncoupling of the front face 23C of the core 21 with respect to the front face 23G of the cladding 22. Thus, a hollowing out 26 is formed in each optical fiber, at the level of the front face of the faceplate 20, and is laterally delimited by the projecting part of cladding 22.

The method for producing such a phosphor screen is now described.

Hollowing outs are formed, by acid etching, at the level of the front face of the optical fiber faceplate 20. The hollowing outs are formed through the difference between the rate of dissolution of the material of the core 21 by the acid and the rate of dissolution of the material of the cladding 22.

A metal layer 50 is deposited, for example of chromium, on the surface of the projecting part of cladding 22 which delimits each hollowing out 26. Preferably, the metal layer 50 is only deposited on the lateral surface of the part of cladding 22. This may be in particular obtained by electron beam deposition with a suitable inclination angle.

The angular filter 30 is then formed on the front face of the optical fiber faceplate 20. The angular filter 30 then rests on the front face 23C of the core 21 of each optical fiber, as well as on the front face 23G of the cladding 22. The angular filter may be produced according to any of the embodiments described previously.

The thin film phosphor layer 10 is then deposited on the front face of the faceplate 20. The layer of phosphor covers the angular filter 30.

A reflective layer 40, for example made of aluminium, is finally deposited on the thin film phosphor layer 10. It should be noted that a layer of $MgF_2$ (not represented) may also be deposited on the thin film phosphor layer 10, prior to the deposition of the layer of aluminium 40, with the aim of improving the reflectivity of the layer of aluminium 40.

Finally, the parts of the different layers 30, 10, 40 that lie on the front face 23G of the cladding 22 of each optical fiber are eliminated. This step may be carried out mechanically.

Preferably, after this latter step, the front face 23G of the cladding 22 of each fiber is substantially at the same level as the layer of aluminium 40, such that the front face of the phosphor screen thereby formed is substantially flat.

The front face 23G of the cladding 22 of each fiber can also be substantially at the same level as the front face of the thin film phosphor layer 10, such that the layer of aluminium 40 is then deposited continuously on the different phosphor pads 12 and on the front face 23G of the cladding 22 of each optical fiber. Thus, the front face of the phosphor screen thereby formed is substantially flat and defined by the layer of aluminium 40.

Thus, pads of layers are formed at the level of each optical fiber core 21, without covering the cladding 22 thereof. Each pad is formed of a layer of phosphor 10, an angular filter 30 and a layer of aluminium 40. In addition, the pads are delimited laterally by the metal layer 50 which ensures a function of reflection of the light rays.

Thus, any light ray emitted by a pad of phosphor 12 can only be transmitted in the core 21 of the adjacent optical fiber. The contrast of the phosphor screen is thus particularly high.

According to a variant illustrated in FIG. 7, the pads of layers are not delimited laterally by a part of optical fiber cladding, but by walls of an added material formed by conventional photolithography techniques.

FIGS. 8A to 8E illustrate the different steps of the method for producing the phosphor screen represented in FIG. 7.

As shown in FIG. 8A, a photosensitive resin is deposited on the front face 23 of the optical fiber faceplate 20, then the faceplate 20 is subjected to a luminous flux from the rear face 24. Thus, the cladding of each optical fiber acts like a mask.

The resin not activated by chemical etching (FIG. 8B) is eliminated. Thus, pads of resin are arranged on the core 21 of each optical fiber.

A suitable material is deposited on the pads of resin and the front face 23G of the claddings 22 (FIG. 8C). The material may be a metal, for example nickel or aluminium, or instead silicon. Said material may be deposited on an adhesion sublayer, for example NiCr—TiW.

Then, the resin activated by chemical etching is eliminated (FIG. 8D). Thus, the walls 27 thereby formed are arranged on the cladding 22 of each optical fiber. Preferably, the walls 27 have a thickness of the order of a micron, for example 1 µm to 1.5 µm.

Finally, the thin film phosphor layer 10, the angular filter 30 and the layer of aluminium 40 are deposited following the same steps as those described with reference to FIG. 6.

A phosphor screen similar to that illustrated in FIG. 6 is thereby obtained (FIG. 8E), except that the pads of layers 10, 30, 40 are delimited laterally by the walls 27 and not by parts of optical fiber cladding.

Obviously, various modifications may be made by those skilled in the art to the invention that has been described, uniquely by way of non-limiting examples.

The invention claimed is:

1. An optical fiber phosphor screen comprising:
   a thin film phosphor layer and an optical fiber faceplate including optical fibers assembled in a bundle and oriented along a thickness of the faceplate, each optical fiber comprising a core of optical index $n_C$ surrounded by a cladding of optical index $n_G$, said thin film phosphor layer being arranged on a face of the faceplate; and
   an angular filter comprising at least one layer, arranged between said thin film phosphor layer and said face of the faceplate, such that a light ray emitted by the thin film phosphor layer and passing through the angular filter penetrates into the core of an adjacent optical fiber with an angle of refraction less than or equal to $\pi/2-\arcsin(n_G/n_C)$.

2. An optical fiber phosphor screen according to claim 1, wherein said angular filter is directly in contact with the thin film phosphor layer and said face of the optical fiber faceplate.

3. An optical fiber phosphor screen according to claim 1, wherein said angular filter is an interference filter comprising a stack of thin films, optical indices and thicknesses of which are adapted to transmit a light ray in the core of the adjacent optical fiber according to an angle of refraction less than or equal to $\pi/2-\arcsin(n_G/n_C)$.

4. An optical fiber phosphor screen according to claim 3, wherein said stack of thin films comprises a first assembly of thin films made of a first material and a second assembly of thin films made of a second material having an optical index less than that of the first material.

5. An optical fiber phosphor screen according to claim 4, wherein the first material is selected from $TiO_2$ and $Ta_2O_5$, and the second material is selected from $MgF_2$, $CaF_2$ and $SiO_2$.

6. An optical fiber phosphor screen according to claim 4, wherein the first material and/or the second material form a porous medium or a non-porous medium.

7. An optical fiber phosphor screen according to claim 1, wherein said angular filter comprises a single layer.

8. An optical fiber phosphor screen according to claim 7, wherein said single layer has an optical index $n_F$ less than or equal to $\sqrt{n_C^2-n_G^2}$.

9. An optical fiber phosphor screen according to claim 7, wherein the material of the single layer of the angular filter forms a non-porous medium.

10. An optical fiber phosphor screen according to claim 7, wherein the material of the single layer of the angular filter forms a porous medium.

11. An optical fiber phosphor screen according to claim 10, wherein said single layer of the angular filter is formed of a plurality of nanometric $SiO_2$ rods.

12. An optical fiber phosphor screen according to claim 10, wherein said single layer of the angular filter has an optical index less than or equal to 1.1.

13. An optical fiber phosphor screen according to claim 1, wherein said thin film phosphor layer is covered, on its face opposite to said angular filter, by a reflective layer vis-à-vis light rays emitted by said thin film phosphor layer.

14. An optical fiber phosphor screen according to claim 1, wherein said thin film phosphor layer forms a plurality of phosphor pads arranged so as to each cover the core of the adjacent optical fiber.

15. An optical fiber phosphor screen according to claim 14, wherein the angular filter forms a plurality of pads arranged so as to be each substantially covered by a phosphor pad.

16. An optical fiber phosphor screen according to claim 15, wherein each assembly formed of a stack of a phosphor pad and an angular filter pad is arranged in a hollowing out of the front face of the optical fiber faceplate, and delimited laterally by a projecting part of optical fiber cladding.

17. An optical fiber phosphor screen according to claim 16, wherein the lateral surface of the projecting part of optical fiber cladding is covered with a layer of a metallic material.

18. An optical fiber phosphor screen according to claim 15, wherein each assembly formed of a stack of a phosphor pad and an angular filter pad is delimited laterally by added walls, each wall being arranged so as to substantially cover the cladding of the adjacent optical fiber.

19. An optical device comprising:
a photocathode to receive photons and emit electrons in response; and
an optical fiber phosphor screen according to claim 1 to form an image from said electrons.

20. An optical device according to claim 19, further comprising electron multiplication means arranged between said photocathode and said phosphor screen.

21. An optical device according to claim 20, said optical device being an image intensifier tube.

* * * * *